US009386564B2

(12) United States Patent
Jiang

(10) Patent No.: US 9,386,564 B2
(45) Date of Patent: Jul. 5, 2016

(54) METHOD AND BASE STATION FOR ADJUSTING UPLINK GRANT PHYSICAL DOWNLINK CONTROL CHANNEL OF USER EQUIPMENT

(75) Inventor: Dajie Jiang, Beijing (CN)

(73) Assignee: CHINA MOBILE COMMUNICATIONS CORPORATION (CN)

( * ) Notice: Subject to any disclaimer, the term of this patent is extended or adjusted under 35 U.S.C. 154(b) by 170 days.

(21) Appl. No.: 13/988,846

(22) PCT Filed: Oct. 20, 2011

(86) PCT No.: PCT/CN2011/081041
§ 371 (c)(1),
(2), (4) Date: Aug. 9, 2013

(87) PCT Pub. No.: WO2012/068934
PCT Pub. Date: May 31, 2012

(65) Prior Publication Data
US 2013/0315093 A1    Nov. 28, 2013

(30) Foreign Application Priority Data

Nov. 24, 2010    (CN) .......................... 2010 1 0557136

(51) Int. Cl.
*H04L 1/00*    (2006.01)
*H04W 72/04*    (2009.01)
(Continued)

(52) U.S. Cl.
CPC ......... *H04W 72/0406* (2013.01); *H04B 17/336* (2015.01); *H04B 17/382* (2015.01);
(Continued)

(58) Field of Classification Search
USPC .................................................. 370/241–252
See application file for complete search history.

(56) References Cited

U.S. PATENT DOCUMENTS

2009/0285160 A1    11/2009    Cheng et al.
2010/0091724 A1    4/2010    Ishii et al.
(Continued)

FOREIGN PATENT DOCUMENTS

CN    101404527 A    4/2009
CN    101448308 A    6/2009
(Continued)

OTHER PUBLICATIONS

International Search Report mailed Feb. 16, 2012 in International Application No. PCT/CN2011/081041, filed Oct. 20, 2011.
(Continued)

*Primary Examiner* — Charles C Jiang
*Assistant Examiner* — Kyaw Z Soe
(74) *Attorney, Agent, or Firm* — Hauptman Ham, LLP

(57) ABSTRACT

The disclosure provides a method and a base station for adjusting an uplink grant physical downlink control channel of a UE adaptively. The method includes: receiving a physical uplink shared channel transmitted on an uplink resource indicated by a current uplink grant physical downlink control channel from the UE; judging whether or not the UE has received the uplink grant physical downlink control channel successfully in accordance with the received physical uplink shared channel; and determining the number of control channel elements CCEs occupied by the uplink grant physical downlink control channel and/or a transmission power of the uplink grant physical downlink control channel in accordance with the judgment result.

18 Claims, 2 Drawing Sheets

(51) Int. Cl.

| | | |
|---|---|---|
| *H04W 52/24* | (2009.01) | |
| *H04W 52/32* | (2009.01) | |
| *H04B 17/336* | (2015.01) | |
| *H04B 17/382* | (2015.01) | |
| *H04W 52/12* | (2009.01) | |
| *H04W 52/14* | (2009.01) | |
| *H04W 52/48* | (2009.01) | |
| *H04W 52/36* | (2009.01) | |
| *H04W 52/54* | (2009.01) | |
| *H04L 5/00* | (2006.01) | |

(52) U.S. Cl.
CPC ........... *H04W 52/24* (2013.01); *H04W 52/241* (2013.01); *H04W 52/325* (2013.01); *H04L 1/0026* (2013.01); *H04L 5/0053* (2013.01); *H04W 52/12* (2013.01); *H04W 52/143* (2013.01); *H04W 52/242* (2013.01); *H04W 52/245* (2013.01); *H04W 52/365* (2013.01); *H04W 52/48* (2013.01); *H04W 52/54* (2013.01)

(56) References Cited

U.S. PATENT DOCUMENTS

| | | | |
|---|---|---|---|
| 2010/0239034 A1 | 9/2010 | Lee et al. | |
| 2010/0265862 A1 | 10/2010 | Choi et al. | |
| 2010/0296472 A1* | 11/2010 | Lee | H04L 1/0026 370/329 |
| 2011/0267967 A1* | 11/2011 | Ratasuk | H04L 5/0053 370/252 |
| 2012/0026985 A1* | 2/2012 | Ren | H04L 1/0025 370/336 |
| 2012/0063341 A1 | 3/2012 | Hamaguchi et al. | |
| 2012/0093118 A1* | 4/2012 | Peters | H04L 1/0081 370/329 |
| 2012/0176996 A1* | 7/2012 | Kim | H04W 72/0413 370/329 |
| 2012/0322492 A1* | 12/2012 | Koo | H04B 7/0417 455/517 |

FOREIGN PATENT DOCUMENTS

| | | |
|---|---|---|
| CN | 101547077 A | 9/2009 |
| CN | 101594668 A | 12/2009 |
| CN | 101622902 A | 1/2010 |
| CN | 101843012 A | 9/2010 |
| CN | 101883369 A | 11/2010 |
| WO | 2009075548 A1 | 6/2009 |
| WO | 2009096698 A2 | 8/2009 |
| WO | 2010122934 A1 | 10/2010 |
| WO | 2010129810 A2 | 11/2010 |

OTHER PUBLICATIONS

Written Opinion mailed Feb. 16, 2012 in China Application No. PCT/CN2011/081041, filed Oct. 20, 2011.

Office Action dated Jan. 6, 2014 in China Application No. 201010557136.4.

Office Action dated Jun. 30, 2014 in China Application No. 201010557136.4.

European Patent Office Supplementary European Search Report, dated Nov. 3, 2015 in European Application No. 11 84 2593.

* cited by examiner

METHOD AND BASE STATION FOR ADJUSTING UPLINK GRANT PHYSICAL DOWNLINK CONTROL CHANNEL OF USER EQUIPMENT

The present application is a National Phase of International Application Number PCT/CN2011/081041, filed Oct. 20, 2011, and claims the priority of the Chinese patent application No. 201010557136.4, filed on Nov. 24, 2010 and entitled "method and base station for adjusting uplink grant physical downlink control channel of UE".

TECHNICAL FIELD

The present application relates to the field of wireless communication technology, in particular to a method and a base station for adjusting an uplink grant physical downlink control channel transmitted to a UE (User Equipment) in a LTE (Long Term Evolution) system.

BACKGROUND

In 3GPP LTE Release 8, Release 9 and Release 10 specifications, each downlink subframe includes a control area and a data area with 14 OFDM (Orthogonal Frequency Division Multiplexing) symbols. The first one to four OFDM symbols of each subframe may serve as the control area, which includes a PCFICH (Physical Control Format Indicator Channel), a PDCCH (Physical downlink control channel), a PHICH (Physical Hybrid HARQ indicator channel), CRSs (Common reference signal) and some blank REs (Resource Element). DCI (Downlink Control Information) carried in the PDCCH includes resource allocation information and other control information sent to one or more UEs (User Equipment). Generally, one subframe may include several PDCCHs, each corresponding to a different UE.

Each PDCCH may be dispersed over the entire bandwidth and all the OFDM symbols within the control area. In accordance with user's channel conditions, the PDCCH may occupy 1, 2, 4 or 8 CCEs (Control Channel Element) adaptively, and each CCE includes 36 REs. For example, for the user with a well channel condition, the PDCCH may occupy 1 or 2 CCEs, and for the user with a bad channel condition, the PDCCH may occupy 4 or 8 CCEs. To be specific, a base station calculates a SINR (Signal to Interference plus Noise Ratio) in accordance with a wideband CQI (Channel Quality Indicator) reported by the UE, and then calculates the number of CCEs occupied by the PDCCH of the UE in accordance with the SINR.

However, the inventor finds that there exists at least the following defect in the prior art during the implementation of the present invention.

The transmission mode for the control area (e.g., 2×2 SFBC, Space Frequency Block Code) is different from that for the data area (including 9 transmission modes, i.e., Transmission mode 1 to Transmission mode 9), and the inter-cell interference over the control area is also different from that over the data area, so the wideband CQI reported by the UE can merely reflect the channel quality of the data area rather than the control area. In addition, there exists a need of reliable PDCCH transmission, e.g., an error rate of the PDCCH transmission shall usually be less than 1%. It is an unstable and rough method to perform the PDCCH link adaptation merely in accordance with the wideband CQI reported by the UE (i.e., selecting 1, 2, 4 or 8 CCEs to transmit the PDCCH).

By using such a method, it is very difficult to ensure that the error rate of the PDCCH transmission is less than 1%.

SUMMARY

Embodiments of the present application provide a method and a base station for adjusting an uplink grant physical downlink control channel of a UE, so as to realize PDCCH link adaptation in a more accurate manner and ensure reliability of PDCCH transmission.

In one aspect of the present invention, there provides a method for adjusting an uplink grant physical downlink control channel of a UE, comprising: receiving a physical uplink shared channel transmitted on an uplink resource indicated by a current uplink grant physical downlink control channel from the UE; judging whether or not the UE has received the uplink grant physical downlink control channel successfully in accordance with the received physical uplink shared channel; and determining the number of control channel elements CCEs occupied by the uplink grant physical downlink control channel and/or a transmission power of the uplink grant physical downlink control channel in accordance with the judgment result.

In another aspect of the present invention, there provides a base station for adjusting an uplink grant physical downlink control channel of a User Equipment UE, comprising a receiving module configured to receive a physical uplink shared channel transmitted on an uplink resource indicated by a current uplink grant physical downlink control channel from the UE; a judging module configured to judge whether or not the UE has received the uplink grant physical downlink control channel successfully in accordance with the physical uplink shared channel received by the receiving module; and an adjusting module configured to determine the number of CCEs occupied by the uplink grant physical downlink control channel and/or a transmission power of the uplink grant physical downlink control channel in accordance with the judgment result of the judging module.

According to the method and base station for adjusting the uplink grant physical downlink control channel of the UE, it is able to adjust the number of CCEs occupied by the PDCCH adaptively, thereby to ensure the reliability of the PDCCH transmission.

DETAILED DESCRIPTION

The present application is described hereinafter with reference to the appending drawings in conjunction with the embodiments.

As mentioned above, PDCCH dedicated to a UE includes resource allocation information and other control information of the UE. To be specific, it includes Downlink Grant (DL Grant) indicating a downlink resource allocation and transmission format and Uplink Grant (UL Grant) indicating an uplink resource allocation and transmission format. The present application provides a scheme for performing UL Grant link adaptation in a more accurate manner.

Figure 1:
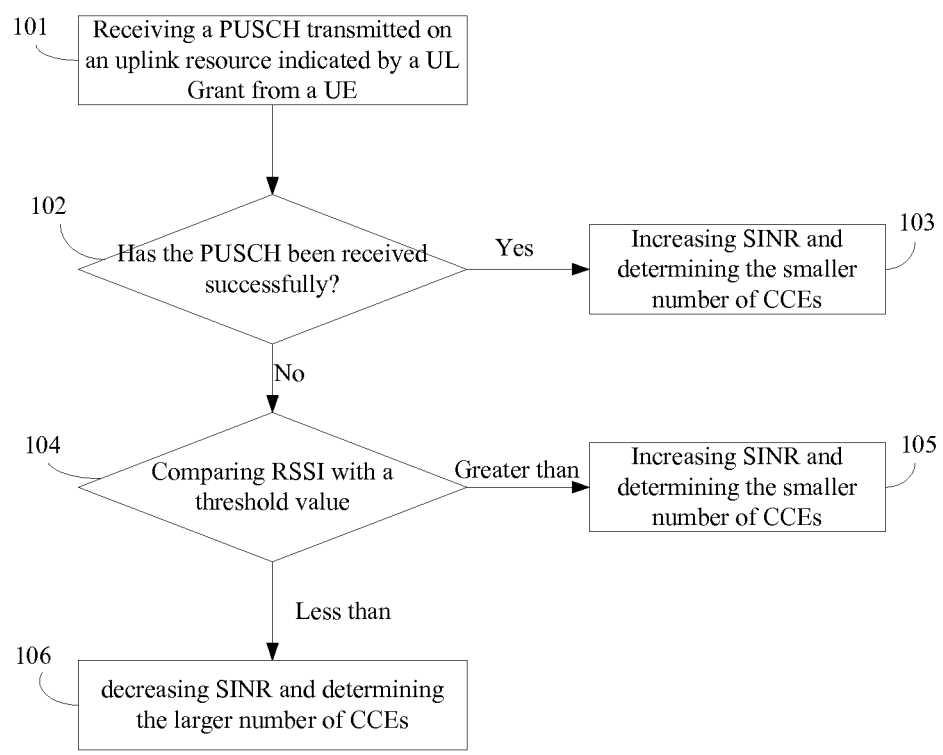
FIG. 1 is a flow chart of a method for adjusting an uplink grant physical downlink control channel of a UE according to one embodiment of the present application.

FIG. 1 shows a method 100 for adjusting an uplink grant physical downlink control channel of a UE. In the present disclosure, the adjustment of the uplink grant physical downlink control channel of the UE specifically means adjustment of the number of CCEs occupied by the uplink grant physical downlink control channel of the UE and/or a transmission power of the uplink grant physical downlink control channel.

At first, after transmitting the UL Grant to the UE, the base station receives in step 101 a Physical Uplink Shared Channel (PUSCH) transmitted by the UE on an uplink subframe and an uplink Resource Block (RB) indicated by the UL Grant.

Then, the base station judges in step 102 whether or not the UE has received the UL Grant successfully in accordance with reception condition of the PUSCH.

To be specific, in step 102, it is determined whether or not the PUSCH received by the base station from the UE corresponds to the UL Grant transmitted from the base station to the UE, i.e., whether or not the base station has received the PUSCH from the UE successfully. For example, whether or not the PUSCH has been received successfully is determined by performing Cyclic Redundancy Check (CRC) on the PUSCH. If the CRC result matches, it means that the UE has received the UL Grant successfully. For convenience, in the disclosure the case where the UE has received the UL Grant successfully is marked as PDCCH ACK, while the case where the UE has not received the UL Grant successfully is marked as PDCCH NACK.

As a result, when it is determined in step 102 that the PUSCH has been received successfully, a current SINR of the UE is increased and the number of CCEs occupied by the UL Grant transmitted to the UE subsequently is determined in accordance with the increased SINR in step 103. To be specific, a positive modified value may be added to the current SINR, and then the number of CCEs occupied by the UL Grant transmitted to the UE may be determined in accordance with the modified SINR. It should be appreciated that, in this case, the number of CCEs determined in accordance with the modified SINR is equal to or less than the number of CCEs previously occupied by the UL Grant of the UE.

In one embodiment, the current SINR is indicated by an up-to-date wideband Channel Quality Indicator (CQI) reported by the UE.

In another embodiment, the base station acquires an up-to-date path loss value from the UE to the base station in accordance with power headroom reported by the UE, and then maps and acquires the current SINR in accordance with the path loss value. In this case, for example, a mapping table of the path loss values to the SINRs may be stored at the base station in advance, and the SINR corresponding to a path loss value may be acquired by looking up the mapping table. The base station can update the mapping table if desired.

In yet another embodiment, the current SINR may be a SINR of the PDCCH recently transmitted to the UE. In this case, the SINR of the PDCCH initially transmitted from the base station to the UE may be set as an initial value (e.g., a demodulation threshold of a 2CCEs PDCCH), or set in accordance with the wideband CQI reported by the UE.

When it is determined in step 102 that the PUSCH has not been received successfully, for example, the CRC result does not match, there may exist two conditions at this time, i.e., the UE has not received the UL Grant successfully, or the UE has received the UL Grant successfully but an error occurs when the base station receives the PUSCH. Hence, when it is determined that the PUSCH has not been received successfully, it needs to further determine the reason for the mismatching.

For this, the base station measures a Received Signal Strength Indicator (RSSI) of the UE on the uplink subframe and the uplink RB indicated by the UL Grant, and compares the measured RSSI with a predetermined threshold value in step 104.

If it is determined that the RSSI measured by the base station on the uplink subframe and the uplink RB is greater than the predetermined threshold value, it means that the UE has received the UL Grant successfully (which is marked as PDCCH ACK). At this time, the base station increases the current SINR of the UE and determines the number of CCEs occupied by the UL Grant transmitted to the UE subsequently in accordance with the increased SINR in step 105. The operations in step 105 are substantially identical to those in step 103.

If it is determined that the RSSI measured by the base station on the uplink subframe and the uplink RB is less than the predetermined threshold value, it means that the UE has not received the UL Grant successfully (which is marked as PDCCH NACK). At this time, the base station decreases the current SINR of the UE and determines the number of CCEs occupied by the UL Grant transmitted to the UE subsequently in accordance with the decreased SINR in step 106. To be specific, a negative modified value may be added to the current SINR, and then the number of CCEs occupied by the UL Grant transmitted to the UE may be determined in accordance with the modified SINR. It should be appreciated that, in this case, the number of CCEs determined in accordance with the modified SINR is equal to or greater than the number of CCEs previously occupied by the UL Grant of the UE.

Although not shown in FIG. 1, it should be appreciated that the current number of CCEs may be maintained and no modification is required when the RSSI is equal to the threshold value.

In the above-mentioned embodiments, the RSSI threshold value may be, for example, set in accordance with an RSSI on a corresponding RB measured by the base station when there exists no PUSCH transmitted on a corresponding uplink subframe and the uplink RB of a cell.

In the above-mentioned embodiments, the UL Grant and its corresponding PUSCH may include a dynamic scheduling UL Grant and its corresponding PUSCH; and the first PUSCH allocated by an uplink semi-persistent scheduling active signaling and a semi-persistent scheduling active signaling. The non-first PUSCH allocated by the uplink semi-persistent scheduling active signaling and the semi-persistent scheduling active signaling is not involved in the present application.

In the above embodiments, the positive and negative modified values may be set in accordance with a target value of a PDCCH BLER (Block Error Rate). For example, the target value of the PDCCH BLER may be set as 1%. It should be appreciated that, in the above steps, the increase or decrease of the SINR will not necessarily decrease or increase the number of CCEs occupied by the UL Grant, and the current number of CCEs may likely remain unchanged. The number of CCEs occupied by the UL Grant will decrease or increase only when the SINR increases or decreases to a certain extent (the extent to which the number of CCEs needs to be adjusted).

Alternatively or additionally, in one embodiment, after judging whether or not the UE has received the UL Grant PDCCH successfully, the transmission power of the UL Grant PDCCH may be adjusted, i.e., the power transmission of the UL Grant PDCCH transmitted to the UE subsequently may be adjusted. To be specific, as mentioned above, when it is judged that the UE has received the UL Grant successfully, the current SINR of the UE may be increased, and when it is judged that the UE has not received the UL Grant successfully, the current SINR of the UE may be decreased. The transmission power of the UL Grant transmitted to the UE subsequently may be determined in accordance with the modified SINR. In the case where the SINR is increased, i.e., the UE has received the UL Grant successfully, the transmission power of the UL Grant may be decreased correspondingly, and in the case where the SINR is reduced, i.e., the UE has not received the UL Grant successfully, the transmission power of the UL Grant may be increased correspondingly.

Figure 2:
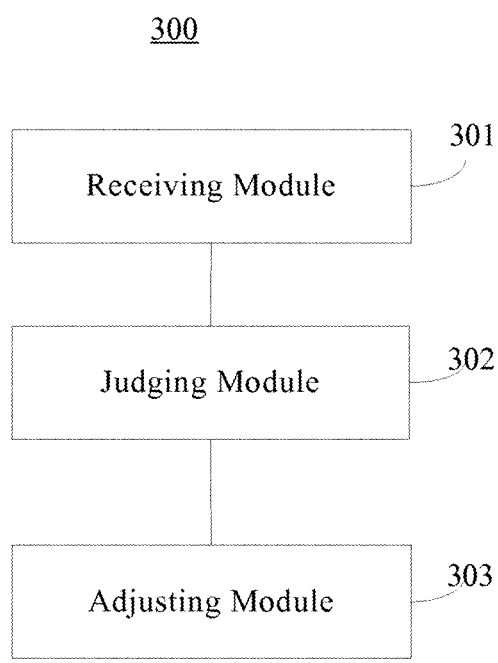
FIG. 2 is a schematic view showing a base station for adjusting an uplink grant physical downlink control channel of a UE according to another embodiment of the present application.

FIG. 2 shows a base station 300 for adjusting an UL Grant of a UE according to one embodiment of the present application. As shown in FIG. 2, the base station 300 comprises a receiving module 301 configured to receive a PUSCH transmitted on an uplink resource indicated by a current UL Grant from the UE; a judging module 302 configured to judge whether or not the UE has received the UL Grant successfully in accordance with the PUSCH received by the receiving module 301; and an adjusting module 303 configured to determine the number of CCEs occupied by the UL Grant in accordance with the judgment result of the judging module 302, i.e., determine the number of CCEs occupied by the UL Grant PDCCH.

In one embodiment, the judging module 302 may perform CRC on the PUSCH received by the receiving module 301 so as to determine whether or not the UE has received the UL Grant transmitted from the base station. If the CRC result matches, it is determined that the UE has received the UL Grant successfully.

In another embodiment, the judging module 302 comprises a judging unit, a measuring unit and a comparing unit (not shown). The judging unit performs the CRC, the measuring unit measures the RSSI of the UL Grant when the CRC result does not match, and the comparing unit compares the RSSI with a predetermined threshold value. If the RSSI is greater than the predetermined threshold value, it is judged that the UE has received the UL Grant successfully, and if the RSSI is less than the predetermined threshold value, it is judged that the UE has not received the UL Grant successfully.

When the judging module 302 judges that the UE has received the UL Grant successfully, the adjusting module 303 increases a current SINR of the UE and determines the number of CCEs occupied by the UL Grant in accordance with the increased SINR. When the judging module 302 judges that the UE has not received the UL Grant successfully, the adjusting module 303 decreases the current SINR of the UE and determines the number of CCEs occupied by the UL Grant in accordance with the decreased SINR.

In one embodiment, the current SINR may be indicated by an up-to-date wideband Channel Quality Indicator (CQI) reported by the UE. In another embodiment, the base station acquires an up-to-date path loss value from the UE to the base station in accordance with power headroom reported by the UE, and then maps and acquires a current SINR in accordance with the path loss value. In this case, for example, a mapping table of the path loss values to the SINRs may be stored at the base station in advance, and the SINR corresponding to a path loss value may be acquired by looking up the mapping table. The base station can update the mapping table if desired. In yet another embodiment, the current SINR may be a SINR of the PDCCH recently transmitted to the UE. In this case, the SINR of the PDCCH initially transmitted from the base station to the UE may be set as an initial value (e.g., a demodulation threshold of a 2CCEs PDCCH), or set in accordance with the wideband CQI reported by the UE.

In the above-mentioned embodiments, the RSSI threshold value may be, for example, set in accordance with an RSSI on a corresponding RB measured by the base station when there exists no PUSCH transmitted on a corresponding uplink subframe and the uplink RB of a cell.

In the above-mentioned embodiments, the UL Grant and its corresponding PUSCH may include a dynamic scheduling UL Grant and its corresponding PUSCH; and the first PUSCH allocated by an uplink semi-persistent scheduling active signaling and a semi-persistent scheduling active signaling. The non-first PUSCH allocated by the uplink semi-persistent scheduling active signaling and the semi-persistent scheduling active signaling is not involved in the present application.

In the above embodiments, the positive and negative modified values may be set in accordance with a target value of a PDCCH BLER (Block Error Rate). For example, the target value of the PDCCH BLER may be set as 1%. It should be appreciated that, in the above steps, the increase or decrease of the SINR will not necessarily decrease or increase the number of CCEs occupied by the UL Grant, and the current number of CCEs may likely remain unchanged. The number of CCEs occupied by the UL Grant will decrease or increase only when the SINR increases or decreases to a certain extent (the extent to which the number of CCEs needs to be adjusted).

Alternatively or additionally, in one embodiment, after the judging module 302 judges whether or not the UE has received the UL Grant PDCCH successfully, the adjusting module 303 may adjust the transmission power of the UL Grant PDCCH transmitted to the UE subsequently may be adjusted. To be specific, as mentioned above, when the judging module 302 judges that the UE has received the UL Grant successfully, the adjusting module 303 may increase the current SINR of the UE and decrease the transmission power of the UL Grant correspondingly, and when the judging module 302 judges that the UE has not received the UL Grant successfully, the adjusting module 303 may decrease the current SINR of the UE and increases the transmission power of the UL Grant correspondingly.

The technical solutions of the present application are described hereinabove with respect to the appending drawings in conjunction with the illustrative embodiments. It should be appreciated that, the above-mentioned embodiments shall not be regarded as limitations to the present application. A person skilled in the art may make appropriate alterations, modifications and/or combinations without departing from the spirit and scope of the present invention.

What is claimed is:

1. A method for adjusting an uplink grant physical downlink control channel of a User Equipment (UE), the method comprising:

receiving a physical uplink shared channel transmitted on an uplink resource indicated by a current uplink grant physical downlink control channel from the UE;

judging whether or not the UE has received the current uplink grant physical downlink control channel successfully in accordance with the received physical uplink shared channel; and determining (i) a number of control channel elements (CCEs) occupied by a subsequent uplink grant physical downlink control channel transmitted to the UE and/or (ii) a transmission power of the subsequent uplink grant physical downlink control channel transmitted to the UE in accordance with a result of the judging;

wherein when it is judged that the UE has received the current uplink grant physical downlink control channel successfully, the determining comprises:

increasing a current Signal to Interference plus Noise Ratio (SINR) of the UE; and determining (i) the number of CCEs occupied by the subsequent uplink grant physical downlink control channel transmitted to the UE and/or (ii) the transmission power of the subsequent uplink grant physical downlink control channel transmitted to the UE in accordance with the increased SINR;

wherein when it is judged that the UE has not received the current uplink grant physical downlink control channel successfully, the determining comprises:

decreasing the current SINR of the UE; and determining (i) the number of CCEs occupied by the subsequent uplink grant physical downlink control channel transmitted to the UE and/or (ii) the transmission power of the subsequent uplink grant physical downlink control channel transmitted to the UE in accordance with the decreased SINR.

2. The method according to claim 1, wherein the judging comprises performing Cyclic Redundancy Check (CRC) on the physical uplink shared channel and the current uplink grant physical downlink control channel, so as to determine whether or not the UE has received the current uplink grant physical downlink control channel successfully.

3. The method according to claim 2, wherein when a result of the CRC matches, it is judged that the UE has received the current uplink grant physical downlink control channel successfully.

4. The method according to claim 3, wherein when the result of the CRC result does not match, the judging further comprises:

measuring a Received Signal Strength Indicator (RSSI) of the UE on a physical uplink shared channel resource indicated by the current uplink grant physical downlink control channel;

comparing the RSSI with a predetermined threshold value;

when the RSSI is greater than the predetermined threshold value, it is judged that the UE has received the current uplink grant physical downlink control channel successfully; and when the RSSI is less than the predetermined threshold value, it is judged that the UE has not received the current uplink grant physical downlink control channel successfully.

5. The method according to claim 1, wherein the physical uplink shared channel comprises a first physical uplink shared channel allocated by an uplink semi-persistent scheduling active signaling and a semi-persistent scheduling active signaling.

6. The method according to claim 5, wherein the current SINR is indicated by a wideband Channel Quality Indicator (CQI) reported by the UE.

7. The method according to claim 5, wherein the current SINR is obtained in accordance with a path loss value of the UE, and the path loss value is determined in accordance with power headroom reported by the UE.

8. The method according to claim 5, wherein the current SINR is a SINR of the uplink grant physical downlink control channel recently transmitted to the UE.

9. The method according to claim 5, wherein the increased SINR and the decreased SINR of the UE are determined in accordance with a given target value of a Physical Downlink Control Channel (PDCCH) Block Error Rate (BLER).

10. A base station for adjusting an uplink grant physical downlink control channel of a User Equipment (UE), the base station comprising:

a receiving module configured to receive a physical uplink shared channel transmitted on an uplink resource indicated by a current uplink grant physical downlink control channel from the UE;

a judging module configured to judge whether or not the UE has received the current uplink grant physical downlink control channel successfully in accordance with the physical uplink shared channel received by the receiving module; and an adjusting module configured to determine (i) a number of CCEs occupied by a subsequent uplink grant physical downlink control channel transmitted to the UE and/or (ii) a transmission power of the subsequent uplink grant physical downlink control channel transmitted to the UE in accordance with a judgment result of the judging module;

wherein when the judging module judges that the UE has received the current uplink grant physical downlink control channel successfully, the adjusting module is configured to increase a current Signal to Interference plus Noise Ratio (SINR) of the UE, and determine (i) the number of CCEs occupied by the subsequent uplink grant physical downlink control channel transmitted to the UE and/or (ii) the transmission power of the subsequent uplink grant physical downlink control channel transmitted to the UE in accordance with the increased SINR;

wherein when the judging module judges that the UE has not received the current uplink grant physical downlink control channel successfully, the adjusting module is configured to decrease the current SINR of the UE, and determine (i) the number of CCEs occupied by the subsequent uplink grant physical downlink control channel transmitted to the UE and/or (ii) the transmission power of the subsequent uplink grant physical downlink control channel transmitted to the UE in accordance with the decreased SINR.

11. The base station according to claim 10, wherein the judging module is configured to perform Cyclic Redundancy Check (CRC) on the physical uplink shared channel and the current uplink grant physical downlink control channel, so as to determine whether or not the UE has received the current uplink grant physical downlink control channel successfully.

12. The base station according to claim 11, wherein if the CRC result matches, the judging module is configured to judge that the UE has received the current uplink grant physical downlink control channel successfully.

13. The base station according to claim 12, wherein the judging module comprises:

a judging unit configured to perform the CRC, a measuring unit configured to measure a Received Signal Strength Indicator (RSSI) of the UE on the current uplink grant physical downlink control channel when the CRC result does not match, and a comparing unit configured to compare the RSSI with a predetermined threshold value, when the RSSI is greater than the predetermined threshold value, it is judged that the UE has received the current uplink grant physical downlink control channel successfully, and when the RSSI is less than the predetermined threshold value, it is judged that the UE has not received the current uplink grant physical downlink control channel successfully.

14. The base station according to claim 10, wherein
the physical uplink shared channel comprises a first physical uplink shared channel allocated by an uplink semi-persistent scheduling active signaling and a semi-persistent scheduling active signaling.

15. The base station according to claim 14, wherein the current SINR is indicated by a wideband Channel Quality Indicator (CQI) reported by the UE.

16. The base station according to claim 14, wherein the current SINR is obtained in accordance with a path loss value of the UE, and the path loss value is determined in accordance with power headroom reported by the UE.

17. The base station according to claim 14, wherein the current SINR is a SINR of the uplink grant physical downlink control channel recently transmitted to the UE.

18. The base station according to claim 14, wherein the adjusting module is configured to determine an increased value and a decreased value of the current SINR of the UE in accordance with a given target value of a Physical Downlink Control Channel (PDCCH) Block Error Rate (BLER).

* * * * *